United States Patent
Tang (10) Patent No.: US 11,166,318 B2
(45) Date of Patent: Nov. 2, 2021

(54) METHOD FOR RANDOM ACCESS, AND TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 162 days.

(21) Appl. No.: 16/480,105

(22) PCT Filed: Jan. 23, 2017

(86) PCT No.: PCT/CN2017/072290
§ 371 (c)(1),
(2) Date: Jul. 23, 2019

(87) PCT Pub. No.: WO2018/133128
PCT Pub. Date: Jul. 26, 2018

(65) Prior Publication Data
US 2019/0373643 A1    Dec. 5, 2019

(51) Int. Cl.
*H04W 74/08*    (2009.01)
(52) U.S. Cl.
CPC ................ *H04W 74/0833* (2013.01)
(58) Field of Classification Search
CPC ................................................ H04W 74/0833
See application file for complete search history.

(56) References Cited

U.S. PATENT DOCUMENTS

| | | | |
|---|---|---|---|
| 2010/0232364 A1* | 9/2010 | Hsu | H04W 74/085 370/328 |
| 2012/0218903 A1* | 8/2012 | Baldemair | H04L 5/0053 370/242 |

(Continued)

FOREIGN PATENT DOCUMENTS

| | | |
|---|---|---|
| CN | 101662836 A | 3/2010 |
| CN | 102291822 A | 12/2011 |

(Continued)

OTHER PUBLICATIONS

International Search Report in international application No. PCT/CN2017/072290, dated Apr. 10, 2017.

(Continued)

*Primary Examiner* — Parth Patel
*Assistant Examiner* — Berhanu D Belete (57) ABSTRACT

Disclosed are a method for random access, and a terminal device and a network device. The method comprises: where the random access of a first terminal device fails, the first terminal device determining, according to a trigger condition of the random access, the length of a waiting time before the random access is initiated again; and the first terminal device re-initiating the random access according to the length of the waiting time. The method, the terminal device and the network device provided in the embodiments of the present applicant can improve the flexibility and system performance of a communication system.

17 Claims, 3 Drawing Sheets

---

200

210 — Under a condition that a first terminal device fails in a random access procedure, the first terminal device determines, according to a condition for initiating the random access procedure, backoff time before re-initiating the random access procedure 220 — The first terminal device re-initiates the random access procedure according to the backoff time

(56) References Cited

U.S. PATENT DOCUMENTS

| | | | | |
|---|---|---|---|---|
| 2013/0136072 | A1* | 5/2013 | Bachmann | H04W 68/00 370/329 |
| 2014/0328325 | A1* | 11/2014 | Bai | H04W 36/0077 370/331 |
| 2015/0173074 | A1* | 6/2015 | Zhao | H04W 74/085 370/336 |
| 2015/0282214 | A1* | 10/2015 | Lee | H04W 74/085 370/329 |
| 2016/0094975 | A1* | 3/2016 | Sheng | H04W 8/005 370/216 |
| 2016/0366702 | A1* | 12/2016 | Baba | H04L 12/413 |
| 2017/0048891 | A1* | 2/2017 | Quan | H04W 48/16 |
| 2017/0265230 | A1* | 9/2017 | Liu | H04W 74/0833 |
| 2018/0270867 | A1* | 9/2018 | Yi | H04W 74/006 |
| 2018/0343659 | A1* | 11/2018 | Hahn | H04W 76/27 |
| 2018/0376394 | A1* | 12/2018 | Hahn | H04W 36/08 |
| 2019/0029053 | A1* | 1/2019 | Quan | H04W 74/004 |
| 2019/0053118 | A1* | 2/2019 | Hahn | H04W 56/001 |
| 2019/0053135 | A1* | 2/2019 | Hahn | H04W 76/10 |
| 2019/0053289 | A1* | 2/2019 | Liu | H04W 74/0833 |
| 2019/0357065 | A1* | 11/2019 | Cho | H04W 24/08 |

FOREIGN PATENT DOCUMENTS

| | | |
|---|---|---|
| CN | 102291836 A | 12/2011 |
| CN | 102438280 A | 5/2012 |
| CN | 103167624 A | 6/2013 |
| CN | 104756586 A | 7/2015 |
| CN | 106028270 A | 10/2016 |
| EP | 3567927 A1 | 11/2019 |
| JP | 2016500979 A | 1/2016 |
| RU | 2405284 C2 | 11/2010 |
| RU | 2456778 C2 | 7/2012 |
| RU | 2583153 C2 | 5/2016 |
| WO | 2016/186542 A1 | 11/2016 |

OTHER PUBLICATIONS

Written Opinion of the International Search Authority in international application No. PCT/CN2017/072290, dated Apr. 10, 2017.
Supplementary European Search Report Appln. No. 17892773.7, dated Nov. 14, 2019.
China Mobile et al: "Backoff for UEs of different priorities", 3GPP Draft; R2-080750, 3rd Generation Partenership Project(3GPP), vol. RAN WG2, no, Sorrento, Italy; Feb. 5, 2008, Feb. 5, 2008(Feb. 5, 2008), XP050138577.
First Office Action of the Chinese application No. 201780084043.4, dated Apr. 7, 2020.
First Office Action of the Chilean application No. 201902044, dated May 15, 2020.
First Office Action of the Russian application No. 2019126470, dated May 20, 2020.
3GPP TS 36.321 V14.1.0 (Dec. 2016); 3rd Generation Partnership Project; Technical Specification Group Radio Access Network; Evolved Universal Terrestrial Radio Access (E-UTRA), Medium Access Control (MAC) protocol specification (Release 14).
Second Office Action of the Chinese application No. 201780084043.4, dated Jul. 14, 2020.
First Office Action of the Canadian application No. 3051018, dated Sep. 4, 2020.
Second Office Action of the Chilean application No. 201902044, dated Aug. 19, 2020.
Written Opinion of the Singaporean application No. 11201906792X, dated Jul. 20, 2020.
Notice of Rejection of the Chinese application No. 201780084043.4, dated Sep. 27, 2020.
Office Action of the Indian application No. 201917032299, dated Jan. 6, 2021.
ASUSTeK,Consideration on back / off access control[online],3GPP TSG—RAN WG2#60 R2/ 075143,2007, Nov. 12, 2016 Internet <URL:http://www.3gpp.org/ftp/tsg_ran/WG2_RL2/TSGR2_60/Docs/R2 / 075143.zip>.
First Office Action of the Japanese application No. 2019-539837, dated Dec. 22, 2020.
Notice of Review of the Chinese application No. 201780084043.4, dated Apr. 26, 2021.
Second Written Opinion of the Singaporean application No. 11201906792X, dated Jun. 21, 2021.
Office Action of the Taiwanese application No. 107101612, dated Apr. 23, 2021.
First Office Action of the Israeli application No. 268183, dated Jul. 26, 2021.
Review Decision of the Chinese application No. 201780084043.4, dated Aug. 3, 2021.

* cited by examiner

| 100 | A network device determines at least one of thresholds or probabilities that are in one-to-one correspondences with multiple conditions for initiating random access procedures, here, each threshold is to indicate first maximum waiting time before a terminal device re-initiates a random access procedure triggered by a corresponding condition, and each probability is to indicate a probability that backoff time determined by the terminal device is less than second maximum waiting time before the random access procedure triggered by the corresponding condition is re-initiated | ~110 |

| The network device sends configuration information to a first terminal device, here, the configuration information includes correspondences between the multiple conditions for initiating the random access procedures and at least one of the thresholds or probabilities | ~120 |

METHOD FOR RANDOM ACCESS, AND TERMINAL DEVICE AND NETWORK DEVICE

TECHNICAL FIELD

The embodiments of the disclosure relate to the field of communications, and in particular to a method for random access, a terminal device and a network device.

BACKGROUND

At present, in a random access procedure for a Long Term Evolution (LTE), after the random access procedure fails, a terminal device needs to wait for a period of time and then may re-initiate the random access procedure, and this period of time is referred to as backoff time. The backoff time is a random value selected from a range between 0 to waiting time specified by a backoff indication parameter received by the terminal device. The solution for selecting the backoff time is not flexible enough in a related art.

SUMMARY

In view of this, the embodiments of the disclosure provide a method for random access, a terminal device and a network device, which can improve the flexibility of the communication and system performance.

In a first aspect, there is provided a method for random access, which may include the following operations.

Under a condition that a first terminal device fails in a random access procedure, the first terminal device determines, according to a condition for initiating the random access procedure, backoff time before re-initiating the random access procedure; and the first terminal device re-initiates the random access procedure according to the backoff time.

Since backoff time required for random access procedures triggered by different conditions is different, the final backoff time is determined based on the condition for triggering the terminal device to perform the random access procedure and thus the flexibility and system performance of a communication system can be improved.

In a possible implementation manner, the operation that the first terminal device determines, according to the condition for initiating the random access procedure, the backoff time before re-initiating the random access procedure may include the following operations.

The first terminal device determines, according to the condition for initiating the random access procedure, at least one of a first threshold corresponding to the condition for initiating the random access procedure or a first probability corresponding to the condition for initiating the random access procedure, here, the first threshold is to indicate first maximum waiting time before the first terminal device re-initiates the random access procedure triggered by the condition, and the first probability is to indicate a probability that the backoff time is less than second maximum waiting time before the random access procedure triggered by the condition is re-initiated; and the first terminal device determines the backoff time according to at least one of the first threshold or the first probability.

Optionally, the terminal device may search for, in a stored table of correspondences between conditions for initiating random access procedures and at least one of thresholds or probabilities, a threshold corresponding to a condition for triggering the first terminal device to initiate the random access procedure, and thus the final backoff time may be determined according to the threshold.

Optionally, the first terminal device determines that the first terminal device fails in the random access procedure may include: a preamble sequence sent by the first terminal device to a network device is absent in random access response information or a contention resolution failure is declared in a collision resolution response.

Optionally, the second maximum waiting time may be notified to the terminal device in advance by a network device via a broadcast, so that the terminal device determines the final backoff time based on the probability. For different conditions, the second maximum waiting time may be different.

In a possible implementation manner, the first terminal device receives a backoff indication parameter sent by a network device, here, the backoff indication parameter is to indicate maximum waiting time before at least one terminal device re-initiates a random access procedure, and the at least one terminal device includes the first terminal device; and the operation that the first terminal device determines the backoff time according to at least one of the first threshold or the first probability may include the following operation.

The first terminal device determines the backoff time according to the backoff indication parameter and at least one of the first threshold or the first probability.

In a possible implementation manner, the operation that the first terminal device determines the backoff time according to the backoff indication parameter and the first threshold may include the following operations.

The first terminal device randomly determines a first duration within the maximum waiting time indicated by the backoff indication parameter; and responsive to that the first duration is greater than a duration corresponding to the first threshold, the first terminal device randomly determines the backoff time within the duration corresponding to the first threshold.

In a possible implementation manner, the operation that the first terminal device determines the backoff time according to the backoff indication parameter and the first threshold may include the following operations.

Responsive to that the maximum waiting time indicated by the backoff indication parameter is greater than a duration corresponding to the first threshold, the first terminal device randomly determines the backoff time within the duration corresponding to the first threshold; and responsive to that the maximum waiting time indicated by the backoff indication parameter is less than the duration corresponding to the first threshold, the first terminal device randomly determines the backoff time within the maximum waiting time indicated by the backoff indication parameter.

In a possible implementation manner, the second maximum waiting time is less than the maximum waiting time indicated by the backoff indication parameter.

In a possible implementation manner, the operation that the first terminal device determines the backoff time according to the backoff indication parameter, the first threshold and the first probability may include the following operations.

The first terminal device randomly determines a second duration according to the backoff indication parameter and the first probability; and responsive to that the second duration is greater than the second maximum waiting time and a duration corresponding to the first threshold, the first terminal device randomly determines the backoff time within the duration corresponding to the first threshold.

In a possible implementation manner, the method may further include the following operation: the first terminal device receives configuration information sent by the network device, here, the configuration information includes one-to-one correspondences between multiple conditions for initiating random access procedures and multiple thresholds, and the multiple conditions for initiating the random access procedures include the condition for initiating the random access procedure.

In a second aspect, there is provided a method for random access, which may include the following operations.

A network device determines at least one of thresholds or probabilities that are in one-to-one correspondences with multiple conditions for initiating random access procedures, here, each threshold is to indicate first maximum waiting time before a terminal device re-initiates a random access procedure triggered by a corresponding condition, and each probability is to indicate a probability that backoff time determined by the terminal device is less than second maximum waiting time before the random access procedure triggered by the corresponding condition is re-initiated; and the network device sends configuration information to a first terminal device, here, the configuration information includes correspondences between the multiple conditions for initiating the random access procedures and at least one of the thresholds or probabilities.

For different conditions for initiating the random access procedures, different threshold values or probabilities are provided, so that the terminal device can select final backoff time based on a condition for initiating the random access procedure by the terminal device, and thus the flexibility and system performance of a communication system can be improved.

In a possible implementation manner, the operation that the network device determines at least one of the thresholds or the probabilities that are in one-to-one correspondences with the multiple conditions for the initiating the random access procedures may include the following operation.

The network device determines, according to priorities of the multiple conditions for initiating the random access procedures, at least one of the thresholds or probabilities that are in the one-to-one correspondences with the multiple conditions for initiating the random access procedures.

A priority of a condition for initiating the random access procedure may be, for example, a priority of a random access scenario, a Quality of Service (QoS) parameter of data to be transmitted or the number of times that the initiated random access procedure fails.

In a possible implementation manner, the method may further include the following operation.

The network device sends a backoff indication parameter to the first terminal device, here, the backoff indication parameter is to indicate maximum waiting time before at least one terminal device re-initiates a random access procedure, and the at least one terminal device includes the first terminal device.

In a third aspect, there is provided a terminal device, which is configured to execute the method in the first aspect or any possible implementation manner of the first aspect. Specifically, the terminal device may include a unit configured to execute the method in the first aspect or any possible implementation manner of the first aspect.

In a fourth aspect, there is provided a network device, which is configured to execute the method in the second aspect or any possible implementation manner of the second aspect. Specifically, the network device may include a unit configured to execute the method in the second aspect or any possible implementation manner of the second aspect.

In a fifth aspect, there is provided a terminal device, which may include: a memory, a processor, an input interface and an output interface. The memory, the processor, the input interface and the output interface are connected via a bus system. The memory is configured to store an instruction, and the processor is configured to execute the instruction stored in the memory to perform the method in the first aspect or any possible implementation manner of the first aspect.

In a sixth aspect, there is provided a network device, which may include: a memory, a processor, an input interface and an output interface. The memory, the processor, the input interface and the output interface are connected via a bus system. The memory is configured to store an instruction, and the processor is configured to execute the instruction stored in the memory to perform the method in the second aspect or any possible implementation manner of the second aspect.

In a seventh aspect, there is provided a computer storage medium, which is configured to store a computer software instruction for executing the method in the first aspect or any possible implementation manner of the first aspect, or the method in the second aspect or any possible implementation manner of the second aspect, and may include a program designed for executing the above aspects.

These aspects and other aspects of the disclosure will become more concise and understandable in the following description of the embodiments.

DETAILED DESCRIPTION

The technical solutions in the embodiments of the disclosure will be described clearly and completely below in combination with the accompanying drawings in the embodiments of the disclosure.

The technical solutions in the embodiments of the disclosure may be applied in various communications systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS) system, a Worldwide Interoperability for Microwave Access (WiMAX) communication system or a future 5G communication system.

Particularly, the technical solutions in the embodiments of the disclosure may be applied in various communication systems based on a Non-Orthogonal Multiple Access (NOMA) technology, such as a Sparse Code Multiple Access (SCMA) system and a Low Density Signature (LDS) system. Certainly, the SCMA system and the LDS system may also be referred to other name in the communication field. Further, the technical solutions in the embodiments of the disclosure may be applied to a multi-carrier transmission system using the NOMA technology, such as Orthogonal Frequency Division Multiplexing (OFDM), Filter Bank Multi-Carrier (FBMC), Generalized Frequency Division Multiplexing (GFDM) and Filtered-OFDM (F-OFDM) systems using the NOMA technology.

The terminal device in the embodiments of the disclosure may be referred to User Equipment (UE), an access terminal, a user unit, a user station, a mobile station, a mobile platform, a remote station, a remote terminal, a mobile device, a user terminal, a terminal, a wireless communication device, a user proxy or user apparatus. The access terminal may be a cellular phone, a cordless telephone, a Session Initiation Protocol (SIP) phone, a Wireless Local Loop (WLL) station, a Personal Digital Assistant (PDA), a handheld device having a wireless communication function, a computing device or other processing devices connected to a wireless modem, vehicle-amounted devices, wearable devices, a terminal device in a future 5G network or a terminal device in a future evolved Public Land Mobile Network (PLMN) network, which is not limited in the embodiments of the disclosure.

The network device in the embodiments of the disclosure may be a device used for communicating with the terminal device. The network device may be, for example, a Base Transceiver Station (BTS) in a GSM or CDMA, a NodeB (NB) in a WCDMA system, an Evolutional NodeB (eNB or eNodeB) in an LTE system, a wireless controller in a Cloud Radio Access Network (CRAN) scenario. The network device may be a relay station, an access point, a vehicle-amounted device, a wearable device, a network device in a future 5G network or a network device in the future evolved PLMN network, which is not limited in the embodiments of the disclosure.

Figure 1:
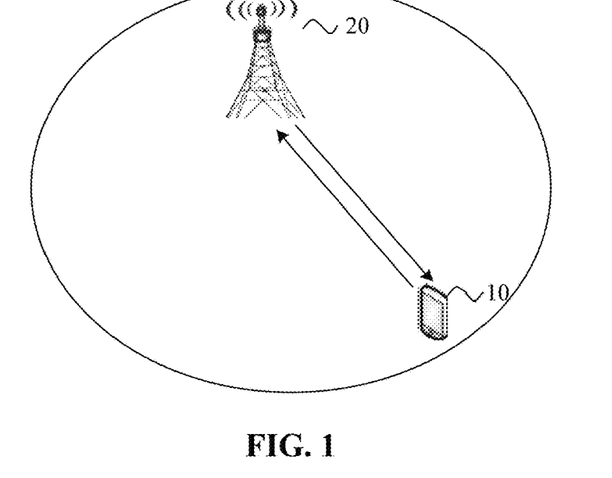
FIG. 1 is a diagram of an application scenario according to an embodiment of the disclosure.

FIG. 1 is a diagram of an application scenario according to an embodiment of the disclosure. The communication system in FIG. 1 may include a terminal device 10 and a network device 20. The network device 20 is configured to provide a communication service for the terminal device 10 and accesses a core network. The terminal device 10 may access a network by searching a synchronization signal, a broadcast signal and the like sent by the network device 20 so as to communicate with the network. The arrows illustrated in FIG. 1 may indicate uplink or downlink transmission of a cellular link between the terminal device 10 and the network device 20.

Figure 2:
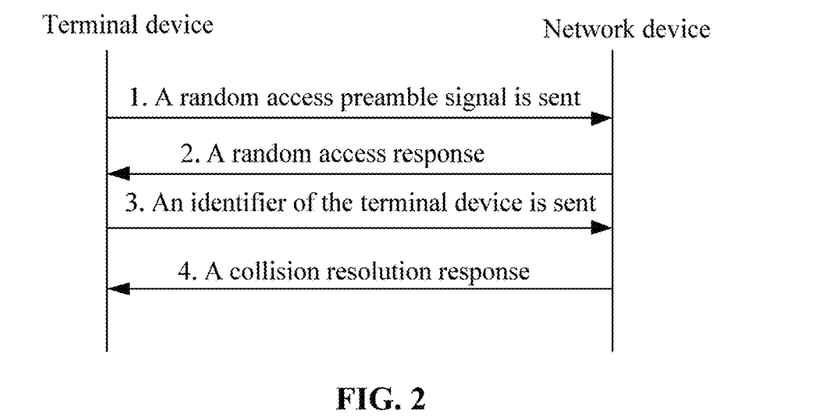
FIG. 2 is a flowchart of a random access procedure.

A random access technology is a primary content for communication between a user and a network in a mobile communication system. In a wireless cellular network, a user initiates a connection request to a network side via a random access procedure. However, in an LTE system, the random access procedure is mainly intended to establish an uplink synchronization and receive a Cell Radio Network Temporary Identifier (C-RNTI). Thus, the random access is applied not only to initial access, but also to a condition in which uplink synchronization of the user is lost. For the ease of understanding, a random access procedure will be simply described below in combination with FIG. 2. As illustrated in FIG. 2, the procedure mainly includes the following several contents.

1. A random access preamble signal is sent. It is mainly intended that a network device may correctly evaluate a transmission time delay of a terminal device, and thus the conflict problem due to the fact that multiple terminal devices simultaneously initiate an access request is solved.

2. Feedback information sent by the network device to the terminal includes a transmission time delay required for uplink synchronization, and an access overload condition of a current system (which are used by the terminal device to perform conflict avoidance based on a backoff mechanism). In addition, the network device feeds back to the terminal an uplink resource position allocated for accessing the terminal device.

3. The terminal device sends a C-RNTI of the terminal device itself on a specified uplink resource.

4. The network device feeds conflict resolution information back to the terminal device. So far, the random access procedure completely solves the conflict problem due to the fact that the multiple terminal devices simultaneously request accessing the system.

Because of the finiteness of access resources, when multiple terminal devices simultaneously initiate access on the same access resource, a collision will occur. Each of the terminal devices may determine, according to whether feedback information in the above content 2 is received within a random access response time window or according to whether a preamble signal in the received feedback information is consistent with the preamble signal sent by the terminal device itself, whether the random access procedure fails. Specifically, when a terminal device does not receive the feedback information within the random access response time window, or a preamble signal in the received feedback information is not consistent with the preamble signal sent by the terminal device itself, the terminal device determines that the random access procedure fails. In addition, the terminal may also determine, according to the conflict resolution information in the above content 4, that the contention resolution fails and likewise may determine that the random access procedure fails.

For different random access preamble signals, the random access response information from the network device includes: a sequence number of a preamble sequence that has been successfully detected and on which no collision occurs, a transmission time delay of the sequence, an uplink transmission resource used by the terminal in the above content 3 and a temporary identifier of the user. In addition, the network device further determines, according to a current load condition of random access, whether a backoff indication parameter for conflict avoidance is added to the random access response. With this backoff indication parameter, each of the terminal devices does not send the preamble signal in a next available random access opportunity immediately in case of a random access collision, but sends the preamble signal again after a time delay, thus reducing the probability of the collision among the terminal devices.

In a future wireless communication system such as 5G, the condition for initiating the random access procedure may include the following cases.

1. An initial Radio Resource Control (RRC) connection establishment. When a terminal device is from an idle state to a connected state, the terminal device initiates the random access procedure.

2. RRC connection reestablishment. After a wireless link fails and when the terminal device needs to reestablish the RRC connection, a UE initiates the random access procedure.

3. When the terminal device performs a handover, the terminal device initiates the random access procedure in a target cell.

4. The downlink data arrives, when the terminal device is in the connected state, the network device has the downlink data to be transmitted to the terminal device and discovers that the terminal device is in an uplink out-of-synchronization state (the network device maintains an uplink timer; and if the uplink timer expires and the network device does not receive a sounding signal from the terminal device, the network device determines that the terminal device is in the uplink out-of-synchronization state), the network device controls the terminal device to initiate the random access procedure.

5. The uplink data arrives, when the terminal device is in the connected state, the terminal device has the uplink data to be transmitted to the network device and discovers that the terminal device itself is in the uplink out-of-synchronization state (the network device maintains an uplink timer; and if the uplink timer expires and the terminal device does not receive a command of adjusting a Time Advance (TA) from the network device, the terminal device determines that the terminal device is in the uplink out-of-synchronization state), the terminal device initiates the random access procedure.

6. When the terminal device is in the connected state, in order to position and in the condition that the TA is needed, the terminal device initiates the random access procedure.

Since the priorities of the conditions for initiating the random access procedures are different, the backoff time for re-initiating the random access procedures is also different. For example, in the above six cases, the priority of the RRC connection is the highest and thus the backoff time before the random access procedure is re-initiated is shortest. Therefore, how to select corresponding backoff time according to different conditions for initiating the random access procedures is given in the embodiments of the disclosure.

Figure 3:
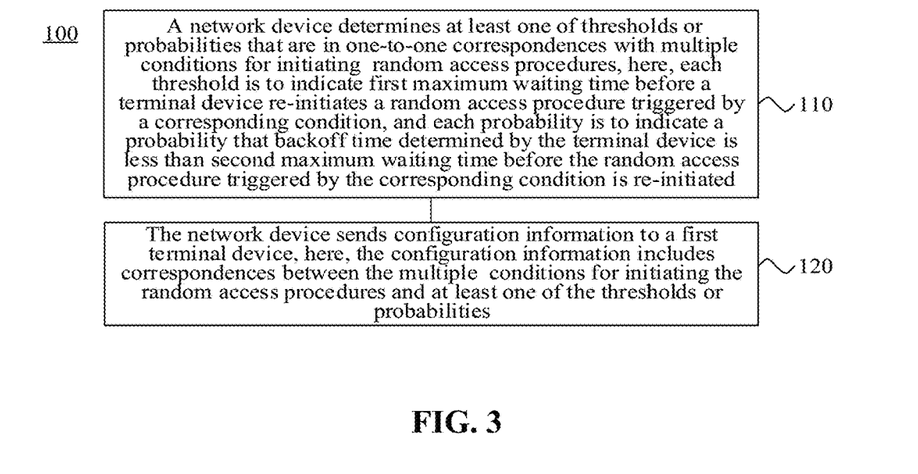
FIG. 3 is a block diagram of a method for random access according to an embodiment of the disclosure.

FIG. 3 is a block diagram of a method 100 for random access according to an embodiment of the disclosure. As illustrated in FIG. 3, the method 100 is described from the perspective of a network device and is specifically executed by a base station. The method 100 mainly includes the following operations.

At S110, a network device determines at least one of thresholds or probabilities that are in one-to-one correspondences with multiple conditions for initiating random access procedures, here, each threshold is to indicate first maximum waiting time before a terminal device re-initiates a random access procedure triggered by a corresponding condition, and each probability is to indicate a probability that backoff time determined by the terminal device is less than second maximum waiting time before the random access procedure triggered by the corresponding condition is re-initiated.

At S120, the network device sends configuration information to a first terminal device, here, the configuration information includes correspondences between the multiple conditions for initiating the random access procedures and at least one of the thresholds or probabilities.

As can be seen from the above, since the backoff time actually required for random access procedures triggered by the different conditions is different, in the related art, maximum waiting time configured by the network device is used for random access procedures triggered by different conditions at a same moment, which is not suitable. Therefore, for random access procedures triggered by the different conditions, at least one of different thresholds or different probabilities are provided, so that the terminal device determines maximum waiting time based on a random access procedure, which is triggered by a condition and initiated by the terminal device, and thus has a better opportunity to select suitable backoff time to improve the communication flexibility and performance.

Optionally, the network device may record multiple times of backoff time before different random access procedures are re-initiated by the terminal device, classify based on different conditions and perform a calculation to obtain corresponding thresholds, such as evaluating an average value. The network device may further determine thresholds in combination with priorities of the conditions for initiating the random access procedures, such as priorities of random access scenarios, Quality of Service (QoS) parameters of data to be transmitted or the number of times that the initiated random access procedure fails. Specifically, the network device may determine corresponding thresholds according to backoff time for different random access procedures under a general condition and priorities of conditions for initiating the different random access procedures. For example, since the priority of the RRC connection is higher than the priority of a cell handover performed by the terminal device, the threshold for an RRC connection scenario may be set as 10 ms, and the threshold for a handover scenario may be set as 20 ms. Also for example, it is general that when the terminal device is in the connected state, a tolerable maximum time delay of to-be-transmitted data carried in a QoS parameter is 30 ms, thus the threshold for an uplink out-of-synchronization scenario in which the random access procedure is initiated by the terminal device may be set as at least 30 ms or below. Also for example, the terminal device initiates five times of RRC connections and the five times of RRC connections all fail; and before the terminal device initiates a sixth time of random access procedure, the network device may re-configure for the terminal device a threshold which corresponds to a small duration.

Optionally, the network device may record multiple times of backoff time before different random access procedures are re-initiated by the terminal device, classify based on different conditions and perform a calculation to obtain corresponding probabilities, such as evaluating a probability that the backoff time falls in a time interval. For example, when the network device finds via the record that nine of ten times of the backoff time in a RRC connection establishment scenario is within an interval [10 ms, 20 ms] and one of ten times of backoff time is greater than 20 ms, the probability that is configured by the network device for the RRC connection establishment scenario and that the backoff time is within 20 ms may be 90%. The 20 ms may be broadcasted to the terminal device by the network device in advance. The network device may further determine different probabilities in combination with priorities of the conditions for initiating the random access procedures, such as priorities for random access scenarios, Quality of Service (QoS) parameters of to-be-transmitted data or the number of times that the initiated random access procedure fails. For example, if the priority of the condition is combined when the probability is configured, likewise for the priority of the RRC connection establishment scenario is higher than the priority of the handover of the terminal device scenario, it may be appropriate to improve the probability for the RRC connection establishment scenario to 90% or more, such as 95%.

The above merely describes the examples of specific implementation on how the network device configures at least one of thresholds or probabilities corresponding to conditions for initiating the random access procedures, which are not limited by the embodiments of the disclosure.

In the embodiments of the disclosure, the description is made to the conditions for initiating the random access procedures involved in the existing communication system, and the condition may further be other conditions for initiating the random access procedures in a future communication system.

The network device should notify, after configuring correspondences between the conditions for initiating the random access procedures and at least one of the thresholds or probabilities, the correspondences to the terminal device via for example, a broadcast. The correspondences may be timely updated at a cycle in combination with an actual scenario.

It may also be seen from the above that when the network device sends the feedback information to the terminal device, maximum waiting time (i.e., the backoff indication parameter in the embodiment of the disclosure) before the terminal device re-initiates the random access procedure when the random access procedure fails, may be carried in the feedback information. It should be understood that the difference between the backoff indication parameter and the thresholds in the embodiment of the disclosure is in that the thresholds are configured for the different conditions for initiating random access procedures, and the backoff indication parameter is configured for all terminal device performing random access procedures simultaneously and having a resource competition. In addition, the backoff indication parameter is configured mainly based on a load condition of the network device, and the thresholds are generally related to the priorities of the different conditions for initiating the random access procedures. The network device may also directly merge the backoff indication parameter and the thresholds into a single based on the load condition of the network device and the priorities of the different conditions, i.e., the maximum waiting time, which is carried in the feedback information by the network device, is multiple maximum waiting time corresponding to the multiple conditions as a matter of fact. Upon the reception of the corresponding relationships, the terminal device may select a corresponding maximum waiting time based on a trigger condition for the terminal device, and thus may further randomly select the final backoff time.

Figure 4:
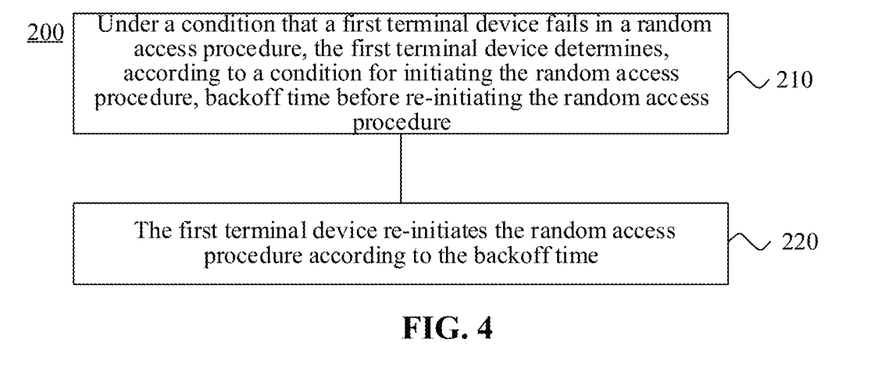
FIG. 4 is another block diagram of a method for random access according to an embodiment of the disclosure.

FIG. 4 is a block diagram of a method 200 for random access according to an embodiment of the disclosure. As illustrated in FIG. 4, the method 200 is described from the perspective of a terminal device and is specifically executed by a UE. The method 200 mainly includes the following operations.

At S210, under a condition that a first terminal device fails in a random access procedure, the first terminal device determines, according to a condition for initiating the random access procedure, backoff time before re-initiating the random access procedure.

At S220, the first terminal device re-initiates the random access procedure according to the backoff time.

Specifically, upon the determination of failure of random access procedure, the first terminal device may determine, according to a condition for triggering the random access procedure at present, backoff time before the random access procedure is re-initiated. For example, if the first terminal device does not receive feedback information within a random access response time window or no preamble signal in the received feedback information is consistent with the preamble signal sent by the first terminal device, the random access procedure fails. Thus the first terminal device determines, according to the condition for initiating the random access procedure, backoff time before the random access procedure is re-initiated. For example, if the condition is an RRC connection, the first terminal device may determine, according to maximum waiting time for the random access procedure triggered by the same condition at a previous time, backoff time before the random access procedure is re-initiated. The terminal device may determine, based on the condition for initiating the random access procedure performed by the terminal device itself, the backoff time before the random access procedure is re-initiated, and can have a better opportunity to select suitable backoff time to improve the communication flexibility and performance.

Optionally, in the embodiment of the disclosure, the operation S210 may include the following operations.

At S211, the first terminal device determines, according to the condition for initiating the random access procedure, at least one of a first threshold corresponding to the condition for initiating the random access procedure or a first probability corresponding to the condition for initiating the random access procedure, here, the first threshold is to indicate first maximum waiting time before the first terminal re-initiates the random access procedure triggered by the condition, and the first probability is to indicate a probability that the backoff time is less than second maximum waiting time before the random access procedure triggered by the condition is re-initiated.

At S212, the first terminal device determines the backoff time according to at least one of the first threshold or the first probability.

For example, if the first terminal device knows in advance correspondences between conditions for initiating random access procedures and at least one of thresholds or probabilities, as illustrated in table 1, the first terminal device may further acquire the first threshold or the first probability corresponding to the random access procedure based on the condition for initiating the random access procedure by the first terminal device.

TABLE 1

| Condition | Threshold | Probability |
| --- | --- | --- |
| Initial RRC connection establishment | 10 ms | 90% (if the second maximum waiting time is 12 ms) |
| RRC connection reestablishment | 20 ms | 80% (if the second maximum waiting time is 25 ms) |
| A cell handover of terminal device | 30 ms | 70% (if the second maximum waiting time is 40 ms) |
| Downlink, terminal device is out-of-synchronization | 40 ms | 80% (if the second maximum waiting time is 50 ms) |
| Uplink, terminal device is out-of-synchronization | 50 ms | 50% (if the second maximum waiting time is 100 ms) |
| Positioning | 60 ms | 80% (if the second maximum waiting time is 75 ms) |

Specifically, when the first terminal device is performing an initial RRC connection establishment, the first terminal device may search for the above table and acquires that the corresponding threshold is 10 ms, i.e., the first terminal device may randomly generate final backoff time within 0 to 10 ms; and when the first terminal device is performing the RRC connection reestablishment, the first terminal device may search for the above table and acquires that the corresponding threshold is 20 ms, i.e., the first terminal device may randomly generate final backoff time within 0 to 20 ms.

When the first terminal device is performing a cell handover of the terminal device, the first terminal device searches for the table and acquires that the corresponding probability is 70%. Herein, the 70% is a probability when the second maximum waiting time is 40 ms, and the first terminal device may randomly generate the final backoff time based on the probability.

Optionally, the first terminal device may further receive the backoff indication parameter configured by the network device. The backoff indication parameter is configured by the network device based on a current load condition. If the maximum waiting time indicated by the backoff indication parameter is 20 ms, the first terminal device may randomly generate a first duration within 0-20 ms, such as 15 ms. In such case, if the first terminal device performs the initial RRC connection, the first terminal device searches for the table and may acquire that the threshold is 10 ms, which is less than 15 ms. Further, the first terminal device may randomly regenerate the final backoff time within 0-10 ms. In addition, if the first duration generated by the first terminal device is less than the threshold configured, the first terminal device may directly take the generated first duration as the final backoff time. The first terminal device may also first determine the magnitude relationship between the maximum waiting time indicated by the backoff indication parameter and the threshold. If the maximum waiting time indicated by the backoff indication parameter is less than the threshold, the first terminal device may randomly generate the final backoff time within 0 to the maximum waiting time indicated by the backoff indication parameter; and if the maximum waiting time indicated by the backoff indication parameter is greater than the threshold, the first terminal device randomly generates the final backoff time within 0 to the threshold.

Optionally, the backoff indication parameter received by the first terminal device may further carry information on several equal parts, which are divided by the network device, of the maximum waiting time indicated by the backoff indication parameter, and correspondingly, each probability is a probability that the first terminal device selects the backoff time in an equal part. For example, if the maximum waiting time indicated by the backoff indication parameter is 60 ms and is divided into six equal parts (i.e., each equal part is 10 ms), the 90% for the initial RRC connection in the table 1 may be the probability that the backoff time is selected within a first equal part (i.e., within 0-10 ms) is 90%. In other words, the probability that the backoff time is selected from 11 ms to 60 ms is 10%.

Optionally, in the embodiment of the disclosure, the first terminal device determines the backoff time according to the backoff indication parameter, the first threshold and the first probability may include the following operations.

The first terminal device randomly determines a second duration according to the backoff indication parameter and the first probability; and responsive to the second duration is greater than the second maximum waiting time and a duration corresponding to the first threshold, the first terminal device randomly determines the backoff time within the duration corresponding to the first threshold.

Specifically, the first terminal device may further determine the final backoff time based on the threshold, the probability and the backoff indication parameter. Also for example, in the above table 1, if the first terminal device performs the initial RRC connection, and the received backoff is 60 ms and is divided into six equal parts, the 90% is the probability that the first terminal device selects the backoff time in the first equal part. However, the first terminal device accidentally selects the backoff time within 10-60 at 10% probability. In such case, the first terminal device does not need to reselect the backoff time at 90% probability but reselect based on the threshold 10 ms, i.e., randomly generates the final backoff time directly within 0-10 ms.

The above various conditions and values in the table 1 are merely for example and are not intended to limit the embodiments of the disclosure.

The interaction between the terminal device and the network device, relevant characteristics, functions and the like described by the terminal device correspond to relevant characteristics and functions of the network device. In other words, what information is sent by the network device to the terminal device and will be received by the terminal device correspondingly.

In various embodiments of the disclosure, the numeral of each process does not mean the precedence of the execution sequence. The execution sequence of each process should be determined by its function and internal logic and does not intended to form any limit to the implementation process in the embodiments of the disclosure.

The methods for the random access according to the embodiments of the disclosure are described above in detail. Hereinafter, devices for the random access according to embodiments of the disclosure will be described below in combination with FIG. 5 to FIG. 8. The technical features in the method embodiments are applied to the following device embodiments.

Figure 5:
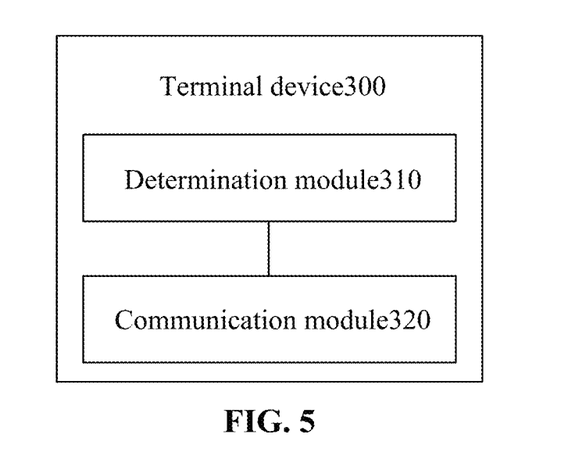
FIG. 5 is a block diagram of a terminal device for random access according to an embodiment of the disclosure.

FIG. 5 is a block diagram of a terminal device 300 for random access according to an embodiment of the disclosure. As illustrated in FIG. 5, the terminal device is a first terminal device. The terminal device 300 may include: a determination module 310 and a communication module 320.

The determination module 310 is configured to determine, under a condition that a first terminal device fails in a random access procedure, according to a condition for initiating the random access procedure, backoff time before re-initiating the random access procedure.

The communication module 320 is configured to re-initiate the random access procedure according to the backoff time.

Therefore, the terminal device for the random access according to the embodiment of the disclosure can improve the system communication flexibility and system performance.

Optionally, in the embodiment of the disclosure, the determination module 310 may include a first determination unit and a second determination unit.

The first determination unit is configured to determine, according to the condition for initiating the random access procedure, at least one of a first threshold corresponding to the condition for initiating the random access procedure or a first probability corresponding to the condition for initiating the random access procedure, here, the first threshold is to indicate first maximum waiting time before the first terminal re-initiates the random access procedure triggered by the condition, and the first probability is to indicate a probability that the backoff time is less than second maximum waiting time before the random access procedure triggered by the condition is re-initiated.

The second determination unit is configured to determine the backoff time according to at least one of the first threshold or the first probability.

Optionally, in the embodiment of the disclosure, the terminal device further includes: a receiving module, configured to receive a backoff indication parameter sent by a network device, here, the backoff indication parameter is to indicate maximum waiting time before at least one terminal device re-initiates a random access procedure, and the at least one terminal device includes the first terminal device. The second determination unit is configured to: determine the backoff time according to the backoff indication parameter and at least one of the first threshold or the first probability.

Optionally, in the embodiment of the disclosure, the second determination unit is configured to: randomly determine a first duration within maximum waiting time indicated by the backoff indication parameter; and randomly determine, responsive to the first duration is greater than a duration corresponding to the first threshold, the backoff time within the duration corresponding to the first threshold.

Optionally, in the embodiment of the disclosure, the second determination unit is configured to: randomly determine, responsive to maximum waiting time indicated by the backoff indication parameter is greater than a duration corresponding to the first threshold, the backoff time within the duration corresponding to the first threshold; and randomly determine, responsive to the maximum waiting time indicated by the backoff indication parameter is less than the duration corresponding to the first threshold, the backoff time within the maximum waiting time indicated by the backoff indication parameter.

Optionally, in the embodiment of the disclosure, the second maximum waiting time is less than maximum waiting time indicated by the backoff indication parameter.

Optionally, in the embodiment of the disclosure, the second determination unit is configured to: randomly determine a second duration according to the backoff indication parameter and the first probability; and randomly determine, responsive to the second duration is greater than the second maximum waiting time and greater than a duration corresponding to the first threshold, the backoff time within the duration corresponding to the first threshold.

Optionally, in the embodiment of the disclosure, the receiving module is further configured to: receive configuration information sent by the network device, here, the configuration information includes one-to-one correspondences between multiple conditions for initiating random access procedures and multiple thresholds, and the multiple conditions for initiating the random access procedures include the condition for initiating the random access procedure.

The terminal device 300 for the random access according to the embodiment of the disclosure may correspond to the first terminal device in the method embodiment of the disclosure; and the above and other operations and/or functions of each unit in the terminal device 300 are respectively intended to implement corresponding procedures of the first terminal device in the method 200 illustrated in FIG. 4, and will not be repeated for the briefness.

Figure 6:
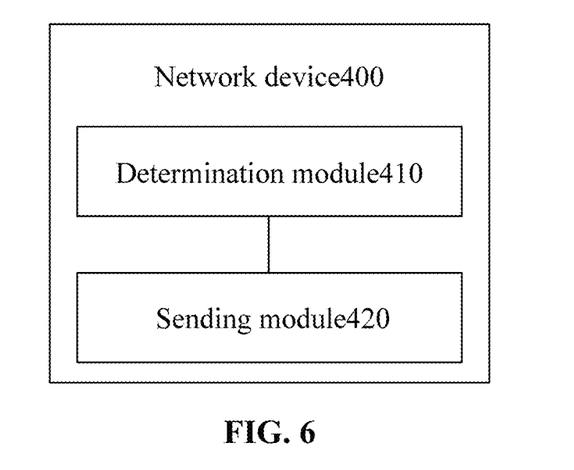
FIG. 6 is a block diagram of a network device for random access according to an embodiment of the disclosure.

FIG. 6 is a block diagram of a network device 400 for random access according to an embodiment of the disclosure. As illustrated in FIG. 6, the network device 400 may include: a determination module 410 and a sending module 420.

The determination module 410 is configured to determine at least one of thresholds or probabilities that are in one-to-one correspondences with multiple conditions for initiating random access procedures, here, each threshold is to indicate first maximum waiting time before a terminal device re-initiates a random access procedure triggered by a corresponding condition, and each probability is to indicate a probability that backoff time determined by the terminal device is less than second maximum waiting time before the random access procedure triggered by the corresponding condition is re-initiated.

The sending module 420 is configured to send configuration information to a first terminal device, here, the configuration information includes correspondences between the multiple conditions for initiating the random access procedures and at least one of the thresholds or probabilities.

Therefore, the network device for the random access according to the embodiment of the disclosure can improve the system communication flexibility and system performance.

Optionally, in the embodiment of the disclosure, the determination module 410 is configured to: determine, according to priorities of the multiple conditions for initiating the random access procedures, at least one of the thresholds or probabilities that are in the one-to-one correspondences with the multiple conditions for initiating the random access procedures.

Optionally, in the embodiment of the disclosure, the sending module 420 is further configured to: send a backoff indication parameter to the first terminal device, here, the backoff indication parameter is to indicate maximum waiting time before at least one terminal device re-initiates a random access procedure, and the at least one terminal device includes the first terminal device.

The network device 400 for the random access according to the embodiment of the disclosure may correspond to the network device in the method embodiment of the disclosure; and the above and other operations and/or functions of each unit in the network device 400 are respectively intended to implement corresponding procedures of the network device in the method 100 illustrated in FIG. 3, and will not be repeated for the briefness.

Figure 7:
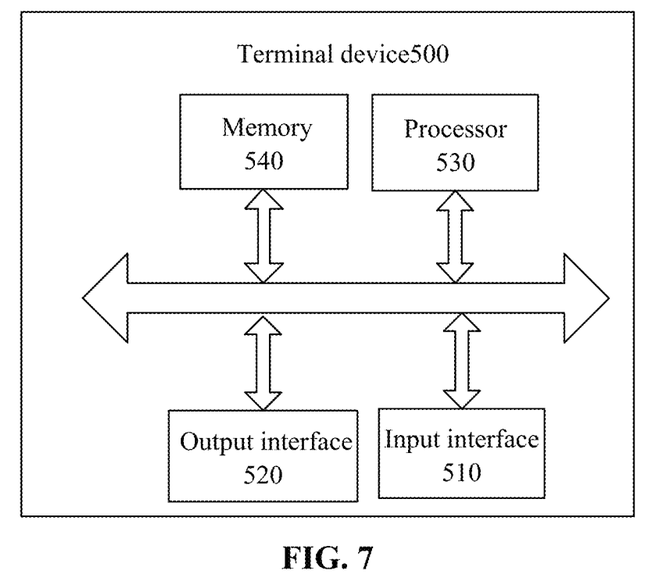
FIG. 7 is another block diagram of a terminal device for random access according to an embodiment of the disclosure.

As illustrated in FIG. 7, an embodiment of the disclosure further provides a terminal device 500 for random access. The terminal device 500 may be the terminal device 300 in FIG. 3, and can be configured to execute the contents, corresponding to the method 200 in FIG. 4, of the first terminal device. The terminal device 500 may include: an input interface 510, an output interface 520, a processor 530 and a memory 540. The input interface 510, the output interface 520, the processor 530 and the memory 540 may be connected via a bus system. The memory 540 is configured to store a program, an instruction or a code. The processor 530 is configured to execute the program, the instruction or the code in the memory 540 to control the input interface 510 to receive a signal and control the output interface 520 to send the signal and accomplish the operations in the method embodiment.

Therefore, the terminal device for the random access according to this embodiment of the disclosure can improve the system communication flexibility and system performance.

In this embodiment of the disclosure, the processor 530 may be a Central Processing Unit (CPU). The processor 530 may further be other universal processors, a Digital Signal Processor (DSP), an Application Specific Integrated Circuit (ASIC) and a Field Programmable Gate Array (FPGA) or other programmable logic devices, discrete gates or transistor logic devices, and discrete hardware component, etc. The universal processor may be a microprocessor or the processor may also be any conventional processor, etc.

The memory 540 may include a Read Only Memory (ROM) and a Random Access Memory (RAM) and provides instructions and data for the processor 530. A part of the memory 540 may further include a nonvolatile RAM. For example, the memory 540 may further store information on a type of a storage device.

During an implementation process, the contents of the methods may be accomplished by an integrated logic circuit of hardware in the processor 530 or an instruction in a software form. The contents of the methods disclosed in combination the embodiments of the disclosure may be directly executed and accomplished by means of a hardware processor or may be executed and accomplished using a combination of hardware and software modules in the processor. The software module may be located in a mature storage medium in the art, such as a RAM, a flash memory, an ROM, a Programmable ROM (PROM), an Electrically EPROM (EEPROM) or a register. The storage medium is located in the memory 540. The processor 530 reads information from the memory 540 and completes the contents of the foregoing methods in combination with the hardware of the processor. In order to avoid repetition, the above will not be described herein in detail.

In a specific implementation manner, the determination module 310 and the communication module 320 in FIG. 3 may be implemented by using the processor 530 in FIG. 7, and the receiving module may be implemented by the input interface 510 in FIG. 7.

Figure 8:
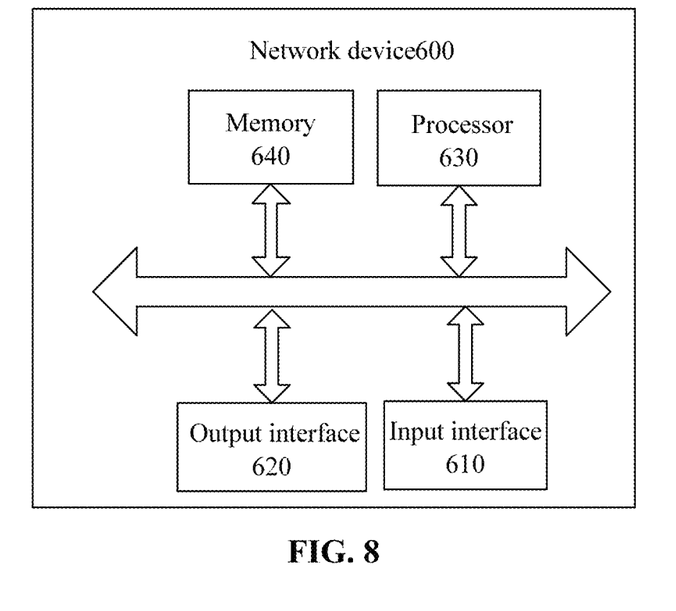
FIG. 8 is another block diagram of a network device for random access according to an embodiment of the disclosure.

As illustrated in FIG. 8, an embodiment of the disclosure further provides a network device 600 for random access. The network device 600 may be the network device 400 in FIG. 4, and can be configured to execute the contents, corresponding to the method 100 in FIG. 3, of the network device. The network device 600 may include: an input interface 610, an output interface 620, a processor 630 and a memory 640. The input interface 610, the output interface 620, the processor 630 and the memory 640 may be connected via a bus system. The memory 640 is configured to store a program, an instruction or a code. The processor 630 is configured to execute the program, the instruction or the code in the memory 640 to control the input interface 610 to receive a signal and control the output interface 620 to send the signal and accomplish the operations in the method embodiment.

Therefore, the network device for the random access according to this embodiment of the disclosure can improve the system communication flexibility and system performance.

In this embodiment of the disclosure, the processor 630 may be a Central Processing Unit (CPU). The processor 630 may further be other universal processors, a Digital Signal Processor (DSP), an Application Specific Integrated Circuit (ASIC) and a Field Programmable Gate Array (FPGA) or other programmable logic devices, discrete gates or transistor logic devices, and discrete hardware component, etc. The universal processor may be a microprocessor or the processor may also be any conventional processor, etc.

The memory 640 may include a Read Only Memory (ROM) and a Random Access Memory (RAM) and provides instructions and data for the processor 630. A part of the memory 640 may further include a nonvolatile RAM. For example, the memory 640 may further store information on a type of a storage device.

During an implementation process, the contents of the methods may be accomplished by an integrated logic circuit of hardware in the processor 630 or an instruction in a software form. The contents of the methods disclosed in combination the embodiments of the disclosure may be directly executed and accomplished by means of a hardware processor or may be executed and accomplished using a combination of hardware and software modules in the processor. The software module may be located in a mature storage medium in the art, such as a RAM, a flash memory, an ROM, a Programmable ROM (PROM), an Electrically EPROM (EEPROM) or a register. The storage medium is located in the memory 640. The processor 630 reads information from the memory 640 and completes the contents of the foregoing methods in combination with the hardware of the processor. In order to avoid repetition, the above will not be described herein in detail.

In a specific implementation manner, the determination module 410 in FIG. 4 may be implemented by using the processor 630 in FIG. 8, and the sending module may be implemented by the output interface 620 in FIG. 8.

A person of ordinary skill in the art may be aware that, in combination with the examples described in the embodiments disclosed in the disclosure, units and algorithm operations may be implemented by electronic hardware, computer software or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the disclosure, it should be understood that the disclosed system, apparatus, and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the disclosure essentially, or the part contributing to the prior art, or some of the technical solutions may be implemented in a form of a software product. The software product is stored in a storage medium and includes several instructions for instructing a computer device (which may be a personal computer, a server, or a network device) to perform all or some of the steps of the methods described in the embodiments of the disclosure. The foregoing storage medium includes any medium that can store program code, such as a U disk, a removable hard disk, an ROM, an RAM, a magnetic disk, or an optical disc.

The foregoing descriptions are merely specific implementation manners of the disclosure but are not intended to limit the protection scope of the disclosure. Any variation or replacement readily figured out by a person skilled in the art within the technical scope disclosed in the disclosure shall fall within the protection scope of the disclosure. Therefore, the protection scope of the disclosure shall be subject to the protection scope of the claims.

The invention claimed is:

1. A method for random access, comprising:
under a condition that a first terminal device fails in a random access procedure, determining, by the first terminal device, according to a condition for initiating the random access procedure, at least one parameter corresponding to the condition for initiating the random access procedure, wherein the at least one parameter comprises a first threshold corresponding to the condition for initiating the random access procedure, and the first threshold is used to determine first maximum waiting time before the first terminal device re-initiates the random access procedure triggered by the condition;
receiving, by the first terminal device, a backoff indication parameter sent by a network device, wherein maximum waiting time before at least one terminal device re-initiates a random access procedure is indicated by the backoff indication parameter, and the at least one terminal device comprises the first terminal device;
responsive to that the maximum waiting time indicated by the backoff indication parameter is greater than or equal to a duration corresponding to the first threshold, randomly determining, by the first terminal device, backoff time within the duration corresponding to the first threshold;
responsive to that the maximum waiting time indicated by the backoff indication parameter is less than the duration corresponding to the first threshold randomly determining, by the first terminal device, backoff within the maximum waiting time indicated by the backoff indication parameter; and
re-initiating, by the first terminal device, the random access procedure according to the backoff time.

2. The method of claim 1, wherein
the at least one parameter further comprises a first probability corresponding to the condition for initiating the random access procedure, wherein the first probability is to indicate a probability that the backoff time is less than second maximum waiting time before the random access procedure triggered by the condition is re-initiated.

3. The method of claim 2, further comprising:
determining, by the first terminal device, the backoff time according to the backoff indication parameter, the first threshold and the first probability.

4. The method of claim 3, wherein the second maximum waiting time is less than the maximum waiting time indicated by the backoff indication parameter.

5. The method of claim 4, wherein determining, by the first terminal device, the backoff time according to the backoff indication parameter, the first threshold and the first probability comprises:
randomly determining, by the first terminal device, a second duration according to the backoff indication parameter and the first probability; and
responsive to that the second duration is greater than the second maximum waiting time and a duration corresponding to the first threshold, randomly determining, by the first terminal, the backoff time within the duration corresponding to the first threshold.

6. The method of claim 1, further comprising:
responsive to that a preamble sequence sent by the first terminal device to a network device is absent in a random access response, determining that the first terminal device fails in the random access procedure; or
responsive to that a contention resolution failure is declared in a collision resolution response, determining that the first terminal device fails in the random access procedure.

7. A terminal device for random access, the terminal device being a first terminal device and comprising:
an input interface,
a processor; and
a memory, wherein the input interface, the processor and the memory are coupled with each other;
wherein the memory is configured to store instructions that, when executed by the processor, cause the processor to determine, under a condition that the first terminal device fails in a random access procedure, according to a condition for initiating the random access procedure, at least one parameter corresponding to the condition for initiating the random access procedure, wherein the at least one parameter comprises a first threshold corresponding to the condition for initiating the random access procedure, and the first threshold is used to determine first maximum waiting time before the first terminal device re-initiates the random access procedure triggered by the condition;
receive, through the input interface, a backoff indication parameter sent by a network device, wherein maximum waiting time before at least one terminal device re-initiates a random access procedure is indicated by the backoff indication parameter, and the at least one terminal device comprises the first terminal device;
responsive to that the maximum waiting time indicated by the backoff indication parameter is greater than or equal to a duration corresponding to the first threshold, randomly determine backoff time within the duration corresponding to the first threshold;
responsive to that the maximum waiting time indicated by the backoff indication parameter is less than the duration corresponding to the first threshold, randomly determine backoff time within the maximum waiting time indicated by the backoff indication parameter; and
re-initiate the random access procedure according to the backoff time.

8. The terminal device of claim 7, wherein
the at least one parameter further comprises a first probability corresponding to the condition for initiating the random access procedure, wherein the first probability is to indicate a probability that the backoff time is less than second maximum waiting time before the random access procedure triggered by the condition is re-initiated.

9. The terminal device of claim 8, wherein
the processor is configured to determine the backoff time according to the backoff indication parameter, the first threshold and the first probability.

10. The terminal device of claim 9, wherein the second maximum waiting time is less than the maximum waiting time indicated by the backoff indication parameter.

11. The terminal device of claim 10, wherein the processor is configured to:
randomly determine a second duration according to the backoff indication parameter and the first probability; and
randomly determine, responsive to that the second duration is greater than the second maximum waiting time and a duration corresponding to the first threshold, the backoff time within the duration corresponding to the first threshold.

12. The terminal device of claim 7, wherein the input interface is configured to:
receive configuration information sent by the network device, wherein the configuration information comprises one-to-one correspondences between a plurality of conditions for initiating random access procedures and a plurality of thresholds, and the plurality of conditions for initiating the random access procedures comprises the condition for initiating the random access procedure.

13. The terminal device of claim 7, wherein the processor is configured to:
responsive to that a preamble sequence sent by the first terminal device to a network device is absent in a random access response, determine that the first terminal device fails in the random access procedure; or
responsive to that a contention resolution failure is declared in a collision resolution response, determine that the first terminal device fails in the random access procedure.

14. A non-transitory computer storage medium having stored thereon computer instructions, that when executed by a processor of a first terminal device, cause the processor to perform a method for random access, the method comprising:
under a condition that the first terminal device fails in a random access procedure, determining, by the first terminal device, according to a condition for initiating the random access procedure, at least one parameter corresponding to the condition for initiating the random access procedure wherein the at least one parameter comprises a first threshold corresponding to the condition for initiating the random access procedure, and the first threshold is used to determine first maximum waiting time before the first terminal device re-initiates the random access procedure triggered by the condition;
receiving, by the first terminal device, a backoff indication parameter sent by a network device, wherein maximum waiting time before at least one terminal device re-initiates a random access procedure is indicated by the backoff indication parameter, and the at least one terminal device comprises the first terminal device;
responsive to that the maximum waiting time indicated by the backoff indication parameter is greater than or equal to a duration corresponding to the first threshold, randomly determining, by the first terminal device, backoff time within the duration corresponding to the first threshold;
responsive to that the maximum waiting time indicated by the backoff indication parameter is less than the duration corresponding to the first threshold randomly determining, by the first terminal device, backoff time within the maximum waiting time indicated by the backoff indication parameter; and
re-initiating, by the first terminal device, the random access procedure according to the backoff time.

15. The non-transitory computer storage medium of claim 14, wherein
the at least one parameter further comprises a first probability corresponding to the condition for initiating the random access procedure, wherein the first probability is to indicate a probability that the backoff time is less than second maximum waiting time before the random access procedure triggered by the condition is re-initiated.

16. The A non-transitory computer storage medium of claim 15, wherein the method further comprises:
determining, by the first terminal device, the backoff time according to the backoff indication parameter, the first threshold and the first probability.

17. The non-transitory computer storage medium of claim 14, wherein the method further comprises:
responsive to that a preamble sequence sent by the first terminal device to a network device is absent in a random access response, determining that the first terminal device fails in the random access procedure; or
responsive to that a contention resolution failure is declared in a collision resolution response, determining that the first terminal device fails in the random access procedure.

* * * * *